July 18, 1967
C. G. VIDRINE ETAL
3,331,314
AGRICULTURAL APPARATUS
Filed May 21, 1965
2 Sheets-Sheet 1
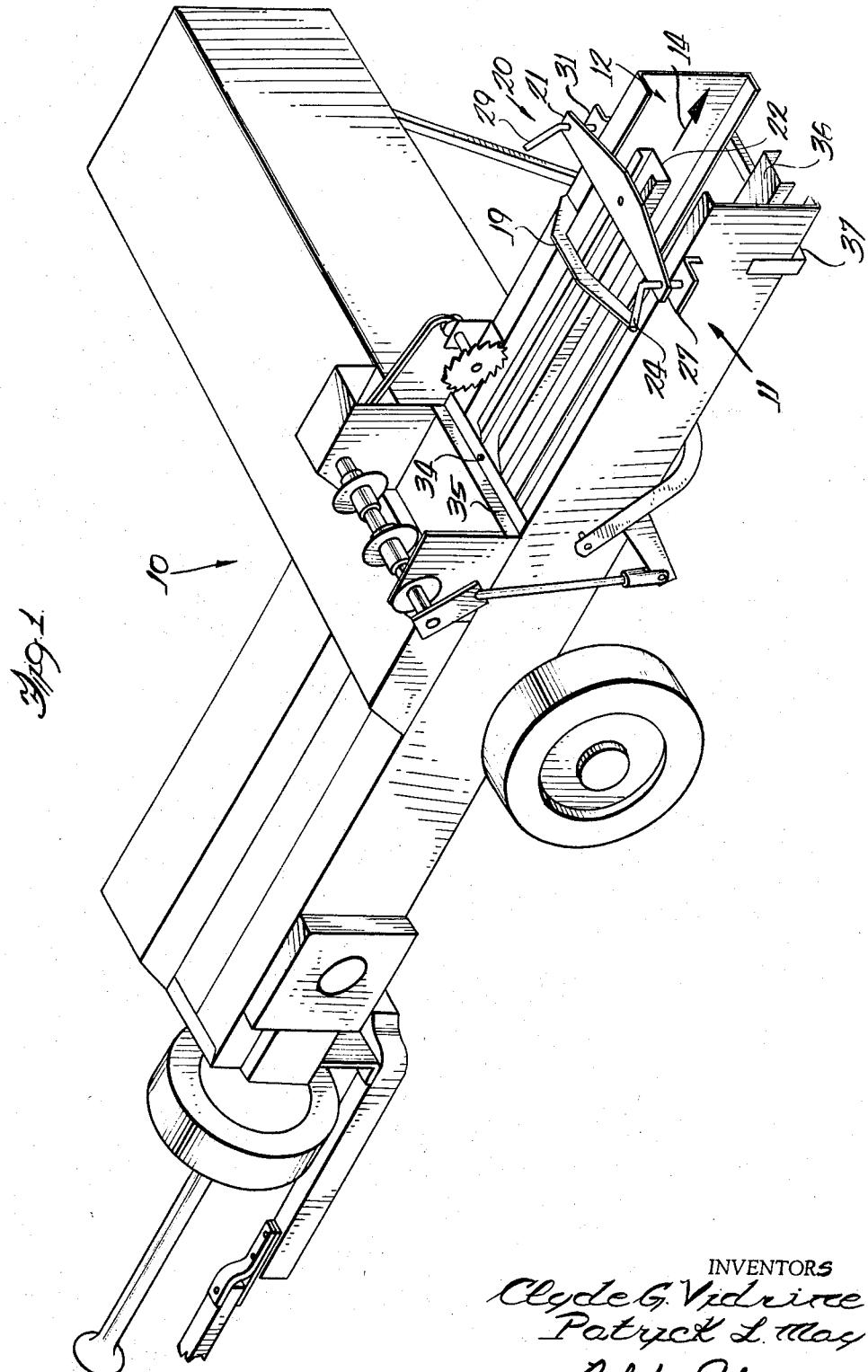
INVENTORS
Clyde G. Vidrine
Patrick L. May
Ralph Alvey
Attorney July 18, 1967
C. G. VIDRINE ET AL
3,331,314
AGRICULTURAL APPARATUS
Filed May 21, 1965
2 Sheets-Sheet 2
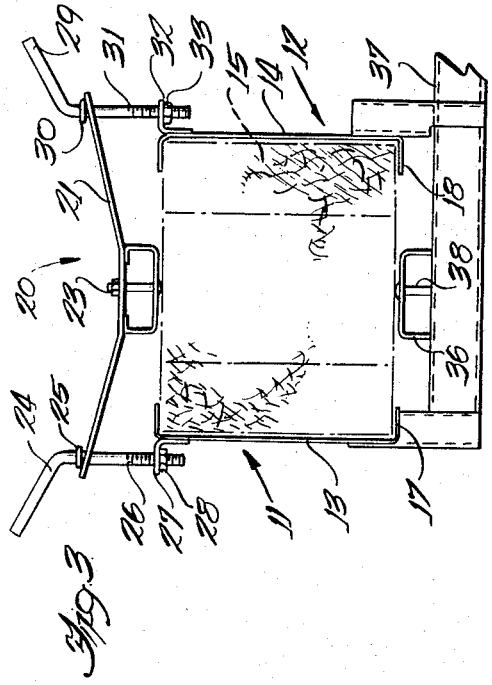
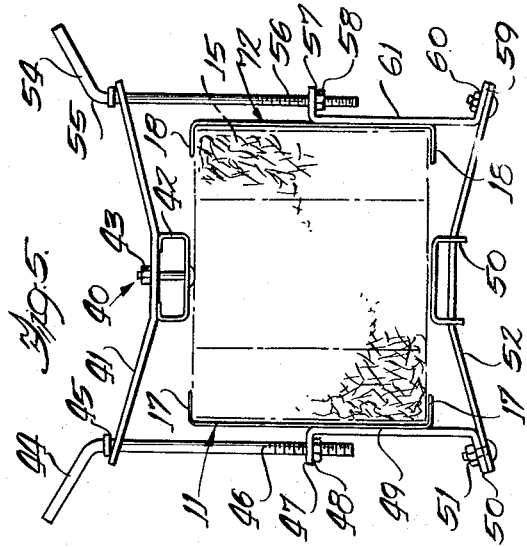
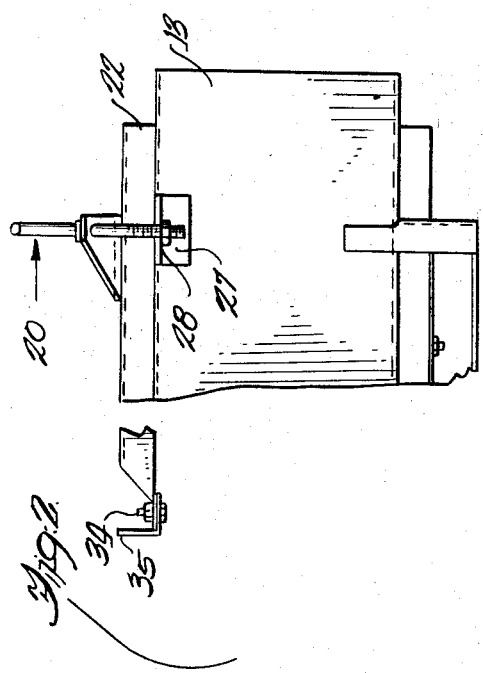
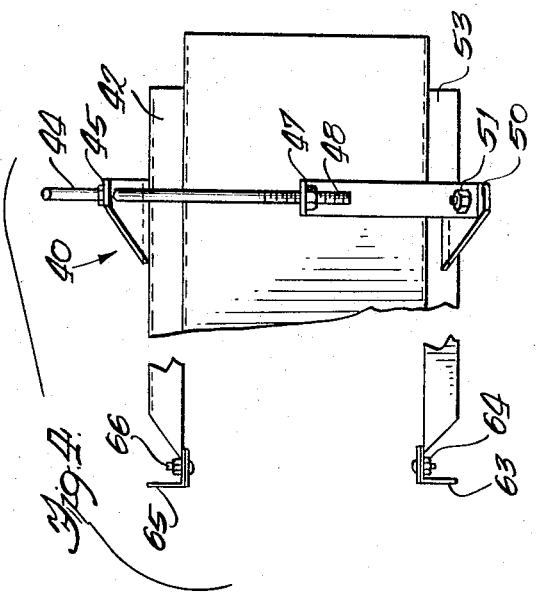
INVENTORS
Clyde G. Vidrine
Patrick L. May
Ralph Alwy
Attorney 3,331,314
AGRICULTURAL APPARATUS
Clyde G. Vidrine and Patrick L. May, Memphis, Tenn., assignors to International Harvester Company, Chicago, Ill., a corporation of New Jersey
Filed May 21, 1965, Ser. No. 457,707
3 Claims. (Cl. 100—192)

This invention pertains to a baler, in particular, to a spring-biased bale density control for the baling chamber of a baler.

Prior art spring-biased bale density controls are generally of two types—the extension spring-type (shown in U.S. Patent No. 2,839,981) and the compression spring-type (shown in U.S. Patent No. 2,947,400). Both types of controls require numerous parts, such as a tension rail, crossbar, a pair of springs, a specially cast and machined threaded spring plug for each spring, and an adjusting screw for each plug. While these parts are simple, they nevertheless increase the cost of the finished baler. Moreover, the adjusting screws of the extension spring-type control are sometimes hidden inside the springs, thereby making it difficult to determine if the two springs are set the same. In the compression spring-type control, it is possible to overcompress the springs and permanently deform the tension rails.

OBJECTS

An object of this invention is to provide a bale density control of simple construction but equal in performance to prior art devices. Another object is to provide a bale density control in which the adjusting screws are visible, so that the setting can be visually checked. A further object of this invention is to provide a bale density control in which the spring is protected from overstressing. Still another object is to provide a bale density control that is less likely to bend the tension rails.

DRAWINGS

The preferred mode of the present invention is shown in the drawings, wherein:

FIG. 1 is a rear view of a hay baler showing the relative location thereon of the present invention;

FIG. 2 is a side elevation of the bale density control of FIG. 1;

FIG. 3 is a rear elevation of the bale density control of FIG. 2;

FIG. 4 is a side elevation of a second species of the novel bale density control; and FIG. 5 is a rear elevation of the bale density control of FIG. 4.

DESCRIPTION

The bale density control of a baler is used to vary the cross sectional area of the baling chamber and, thereby, the resistance to movement of bales through the baling chamber. This resistance provides most of the head against which the baler plunger compacts the hay into a bale. Thus, by reducing the baling chamber cross sectional area the resistance to bale movement and the bale is density increased. By increasing the baling chamber cross sectional area, the resistance to bale movement and the bale density are reduced.

A conventional hay baler 10 (FIG. 1) includes a pair of steel plate channel baling chamber sections 11 and 12 rigidly attached to a supporting structure and extending the length of the baler to form the baling chamber. The flanges 17 and 18 (FIGS. 2–3) of channel members 11 and 12 are separated by a distance equal to the thickness of a bale. The vertical webs 13 and 14 of the channels are separated by a distance equal to the width of the bale. A rigid steel brace 19 helps to maintain the space between the channel members 11 and 12. The flanges 17 and 18 of the channel members point inward to provide a partial top and bottom to the baling chamber. A tension rail 22 pivotally attached to a supporting structure 35 by bolt and nut 34 completes the top of the baling chamber. A tension rail 36, rigidly attached by bolt and nut 38 to support 37, completes the bottom of the baling chamber. The bale density control 20 (FIGS. 1–3) and the bale density control 40 (FIGS. 4–5) are used to vary the position of the tension rail and, thereby, the cross sectional area of the baling chamber outlet.

The bale density control 20 (FIGS. 1–3) comprises angle iron bracket 27 welded or bolted to the left channel member 11, and an angle iron bracket 32 similarly attached to right channel member 12. Each bracket has a hole (not shown) drilled through its horizontal leg. A nut 28 is welded to the bottom side of the horizontal leg of bracket 27 coaxially with the hole. Similarly, a nut 33 is welded to the bottom side of the horizontal leg of bracket 32 coaxial with the hole in that leg. A leaf spring cross bar 21 of spring steel bridges the space separating the channel members 11 and 12. A horizontal, intermediate section of the spring 21 is bolted at 23 to tension rail 22. Each inclined end of the leaf spring 21 contains a hole (not shown) for the hand adjusting members 24 or 29. Threads 26 at the end of adjusting member 24 screw into the nut 28; while threads 31 at the lower end of adjusting member 29 screw into the nut 33. The length of the threads 26 and 31 is limited, so that the adjusting members cannot be turned so far as to overstress leaf spring crossbar 22. The collars 25 and 30 on adjusting members 24 and 29 transmit movements of the adjusting members to the leaf spring cross bar.

The operation of bale density, control 20 is as follows: to increase bale density adjusting members 24 and 29 are turned so that the collars 25 and 30 move downward to push the tension rail 22 towards the center of the baling chamber. The cross sectional area of the baling chamber is thereby reduced, increasing the resistance to movement of the bale of hay 15 through the chamber. Movement of the bale is in the direction of the arrow 14 (FIG. 1). The spring 21 provides a constant back pressure for any one setting. If the bale density tends to increase, leaf spring cross bar 21 yields to reduce the back pressure, so that the desired bale density is maintained. When the desired operating conditions are restored, the spring cross bar 21 returns tension rail 22 to its normal setting.

To decrease bale density, adjusting members 24 and 29 are turned so that the collars 25 and 30 move up and allow the tension rail 22 and leaf spring cross bar 21 to be pushed outwardly by the hay being baled. With the increase in the cross sectional area of the baling chamber, the head against which the bales are formed is reduced. Accordingly, less hay is forced into each bale by the plunger, thereby lowering the density of the bales.

Since the threads 26 and 31 on adjusting members 24 and 29 are visible, it is possible to gauge the distance between the top of the brackets 27 and 32 and the flanges 25 and 30 for similarity of setting. Also, since the length of the threads 26 and 31 is limited, the extent to which leaf spring cross bar 21 can be flexed is limited, thereby protecting the spring cross bar from overstressing. Further, it is impossible to bend tension rail 22 regardless of the stress placed on spring cross bar 21, as spring 21 will deflect further rather than transfer the load to the tension rail.

The bale density control 40 (FIGS. 4–5) comprises a left tie bracket 49 of steel strap bearing against the exterior of channel member 11 and a similar, right tie bracket 61 bearing against the exterior wall of channel member 12. The tie brackets 49 and 61 are free floating and can slide along the exterior walls of the channel members 11 and 12. Upper leg 47 of bracket 49 contains a hole (not shown) below which a nut 48 is welded to the leg. Likewise, upper leg 57 of bracket 61 contains a hole (not shown) below which a nut 58 is welded to the leg. Both nuts 48 and 58 are aligned with the holes in the respective bracket legs. Leaf spring cross bar 41 of spring steel extends across the space separating the channel members 11 and 12. The horizontal, intermediate section of leaf spring 41 is attached by bolt and nut 43 to a tension rail 42, the inner end of which is pivotally supported on member 65 by nut and bolt 66. Both inclined ends of spring 41 contain holes (not shown) for one of the adjusting hand members 44 and 54. Threads 46 at the end of adjusting member 44 screw into the nut 48; threads 56 at the end of adjusting member 54 screw into nut 58. Collar 45 on member 44 and collar 55 on member 54 bear against spring cross bar 41. Lower tension rail 53 is supported by the leaf spring cross bar 52, which has a horizontal, center portion that passes through slots in the flanges of the channel-shaped tension bar. The inner end of tension bar 53 is pivotally attached to member 63 by nut and bolt 64. The sloping ends of spring 52 are attached by nut and bolt 51 and nut and bolt 60 to lower legs 50 and 59, respectively, of brackets 49 and 61.

The visible threads 46 and 56 make it possible to set both adjusting members the same. Also, the unthreaded sections on adjusting members 44 and 54 prevent overstressing of the spring cross bars 41 and 52. Leaf spring cross bars 41 and 52 also yield to prevent the tension rails from being bent if the adjusting members 44 and 54 are tightened excessively.

The operation of bale density control 40 is as follows: to increase bale density, members 44 and 54 are turned so that flanges 45 and 55 move downward. This moves tension rail 42 and tension rail 53 closer together and, thereby, reduces the cross sectional area of the baling chamber. The two tension rails oppose the movement of the bale 15 through the baling chamber. If the density of the bale exceeds the density for which the control is set, spring cross bars 41 and 52 yield to allow the tension rails to move apart. The back pressure on the hay is thereby reduced, and the density of the bale is decreased. When the operating conditions return to normal, the spring cross bars 41 and 51 return the tension rails to their normal position. To decrease bale density, the adjusting members 44 and 54 are turned so that collars 45 and 55 move up and allow the tension bars 42 and 53 to move apart. The cross sectional area of the bale chamber is increased, so that the head against which the bales are formed is reduced.

The above description covers only the preferred modes of the invention. The invention is not, however, limited to those modes but embraces all equivalent forms that fall within the spirit and scope of the attached claims. Specific details are given as illustrations only and are not to be construed as limitations of the invention.

What is claimed is:

1. A bale density control for the baling chamber of a baler, comprising: a supporting structure; a first, channel-shaped bale chamber member fixedly attached to said supporting structure; a threaded fastening means on said bale chamber member; a second, channel-shaped bale chamber member fixedly attached to said supporting structure, said second bale chamber member being located opposite said first bale chamber member and spaced therefrom; said space between said channel-shaped bale chamber members forming a portion of said baling chamber; a threaded fastening means on said second bale chamber member; a first and a second opening from said portion of said baling chamber; a tension rail pivotally attached to said supporting structure intermediate said channel-shaped bale chamber members and adjacent one of said bale chamber openings; a leaf spring cross bar bridging the space between said channel-shaped bale chamber members and engaging said tension rail; a threaded fastening means at one end of said leaf spring cross bar engaging one of said threaded fastening means on one of said channel-shaped bale chamber members; a threaded fastening means at the other end of said leaf spring cross bar engaging the threaded fastening means on the other one of said channel-shaped bale chamber members; a second tension rail attached to said supporting structure intermediate said channel-shaped bale chamber members and adjacent the other one of said bale chamber openings.

2. A bale density control as recited in claim 1, wherein: said second tension rail is fixedly attached to said supporting structure.

3. A bale density control for the baling chamber of a baler, comprising: a supporting structure; a first, channel-shaped bale chamber member fixedly attached to said supporting structure; a tie bracket slidable along said channel-shaped member, threaded fastening means on said tie bracket; a second channel-shaped bale chamber member fixedly attached to said supporting structure, said second bale chamber member being located opposite said first bale chamber member and spaced therefrom; said space betwen said channel-shaped bale chamber members forming a portion of said baling chamber; a tie bracket slidable along said second channel-shaped member, threaded fastening means on said last-named tie bracket; a first and a second opening from said portion of said baling chamber; a tension rail pivotally attached to said supporting structure intermediate said channel-shaped bale chamber member and adjacent one of said bale chambers openings; a leaf spring cross bar bridging the space between said channel-shaped bale chamber members and engaging said tension rail; a threaded fastening means at one end of the said leaf spring cross bar engaging one of said threaded fastening means on one of said tie brackets; a threaded fastening means at the other end of said leaf spring cross bar engaging the threaded fastening means on the other of said tie brackets; a second tension rail pivotally attached to said supporting structure intermediate said channel-shaped bale chamber members and adjacent the other one of said bale chamber openings; a leaf spring cross bar bridging the space between said channel-shaped bale chamber members adjacent said other one of said bale chamber openings, one end of said last-named leaf spring cross bar being fixedly attached to one of said tie brackets and the other end of said last-named leaf spring cross bar being fixedly attached to the other one of said tie brackets, said second tension rail engaging said last-named leaf spring cross bar intermediate the ends thereof.

References Cited

UNITED STATES PATENTS

| | | | |
|---|---|---|---|
| 720,055 | 2/1903 | McNair | 100—191 X |
| 1,065,648 | 6/1913 | Wygant | 100—191 X |
| 2,718,189 | 9/1955 | Bornzin | 100—43 |
| 2,839,981 | 6/1958 | Harstick et al. | 172—297 X |
| 2,902,922 | 9/1959 | Williams | 100—192 X |
| 2,910,932 | 11/1959 | Wathen | 100—191 |
| 2,947,400 | 8/1960 | Murray et al. | 193—5 |
| 3,202,087 | 8/1965 | Burford | 100—22 X |

LOUIS O. MAASSEL, *Primary Examiner.*